B. PUSKÁS.
VALVE.
APPLICATION FILED NOV. 22, 1912.
1,069,725.
Patented Aug. 12, 1913.
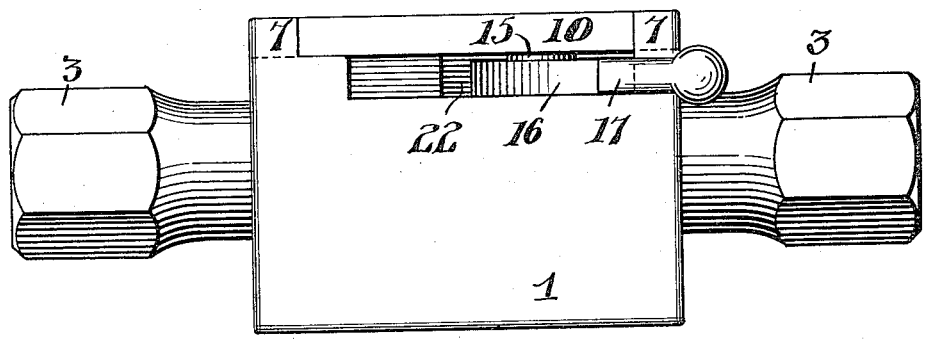
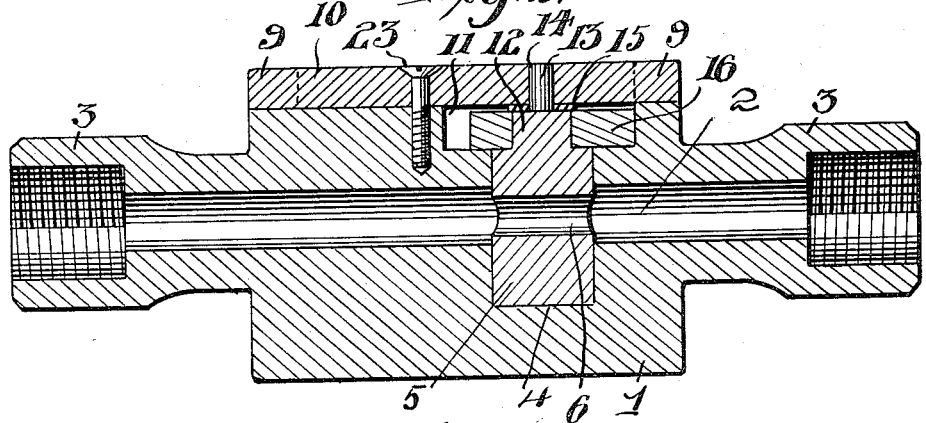
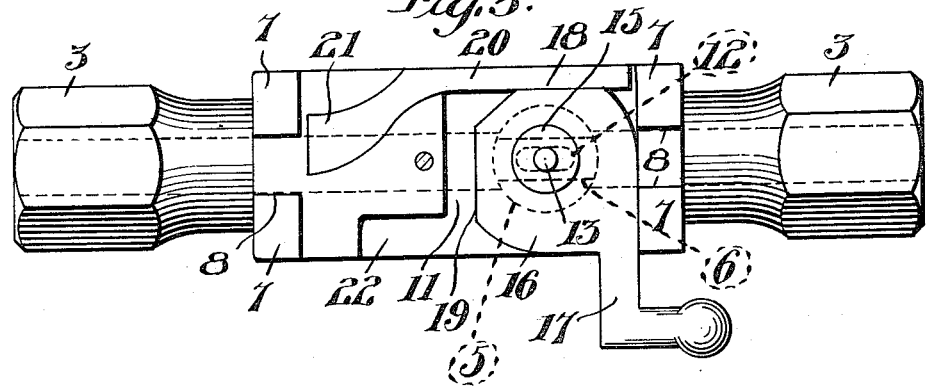
WITNESSES
Samuel Payne.
Karl H. Butler
INVENTOR
Bálint Puskás
By N. Evert
ATTORNEYS

UNITED STATES PATENT OFFICE.

BÁLINT PUSKÁS, OF WINDBER, PENNSYLVANIA, ASSIGNOR OF ONE-HALF TO ANDY TARJAN, OF WINDBER, PENNSYLVANIA.

VALVE.

1,069,725.  Specification of Letters Patent.  Patented Aug. 12, 1913.

Application filed November 22, 1912. Serial No. 732,818.

*To all whom it may concern:*

Be it known that I, BÁLINT PUSKÁS, a subject of the King of Hungary, residing at Windber, in the county of Somerset and State of Pennsylvania, have invented certain new and useful Improvements in Valves, of which the following is a specification, reference being had therein to the accompanying drawing.

This invention relates to valves, and the primary object of my invention is to provide a simple and inexpensive valve that can be advantageously used for controlling the supply of gas, water, steam or any fluid, the valve having a novel spring pressed operating lever that is positively held in adjusted position with the valve either open or closed.

A further object of this invention is to provide a strong and durable gas valve consisting of comparatively few parts that can be easily and quickly assembled to form a valve that is highly efficient for the purposes for which it is intended.

With the above and other objects in view the invention resides in the novel construction, combination and arrangement of parts to be hereinafter specifically described and then claimed.

Reference will now be had to the drawing, wherein:—

Figure 1 is a side elevation of the valve, Fig. 2 is a longitudinal sectional view of the same, and Fig. 3 is a plan of the valve with the cover plate thereof removed.

A valve in accordance with this invention comprises a rectangular body 1 having a longitudinal port 2 in communication with connections 3. The body 1 has a plug recess or seat 4 intersecting the longitudinal port 2 and rotatably mounted in the recess 4 is a plug 5 provided with a port 6 adapted to aline with the port 2 of the valve body. The top of the valve body is provided with end walls 7 having longitudinally alining grooves 8 to receive the tongues 9 of a cover or top plate 10. The cover or top plate 10 closes a recess 11 formed in the top of the valve body at the end of the plug recess 4.

The plug 5 has a rectangular portion 12 within the recess 11 and a stem 13 extending into an opening 14 provided therefor in the cover 10. A washer or gasket 15 surrounds the stem 13, between the cover 10 and the rectangular portion 12 of the plug 5. Both sides of the recess 11 are open and mounted upon the rectangular portion of the plug 5 is a head 16 of an operating lever 17 that protrudes from one side of the recess 11. The head 16 has flat sides 18 and 19 adapted to be engaged by a flat spring 20 that closes one side of the recess 11. The spring 20 has the enlarged end 21 thereof mounted in the top of the valve body, as best shown in Fig. 3. The recess 11 is shaped, as at 22 to accommodate a portion of the operating lever 17.

A screw 23 or other fastening means can be resorted to for retaining the cover or top plate 10 in engagement with the valve body.

As illustrated in Figs. 2 and 3 the port 6 of the valve plug 5 alines with the port 2 when the valve is open. With the valve open the flat face 18 of the head 16 is engaged by the spring 20. By swinging the operating lever 17 whereby a portion thereof enters the recess, the flat face 19 is shifted into engagement with the spring 20 and the valve plug is held with the port 6 at right angles to the port 2, consequently the valve is closed.

The same principle involved in my invention is applicable to a four-way valve, and I would have it understood that the invention is susceptible to such changes as fall within the scope of the appended claim.

What I claim is:—

A valve comprising a body provided with a port, a valve plug rotatably mounted in said valve body and intersecting said port and having a port adapted to aline with the first mentioned port, the top of said body having grooved end walls and a recess adjacent to one of said ends walls, a cover plate mounted upon said body and having tongues fitting in the grooves of said end walls, said cover plate having an opening to receive the upper end of said plug, a head mounted upon said plug within the recess of said valve body and having an operating lever protruding from one side of said recess and adapted to swing partially therein, said head having flat faces, and a flat spring mounted in said valve body and closing one side of said recess and adapted to engage the faces of said head to hold said valve plug in adjusted position.

In testimony whereof I affix my signature in the presence of two witnesses.

BÁLINT PUSKÁS.

Witnesses:
W. C. MOORE,
ANDY TARIAN.